United States Patent
Nottingham et al.

(10) Patent No.: US 7,469,480 B2
(45) Date of Patent: Dec. 30, 2008

(54) LASER LINER

(75) Inventors: John Nottingham, Bratenahl, OH (US);
John Spirk, Gates Mills, OH (US);
Patrick Brown, Mantua, OH (US);
Robert Dorsey, Columbia Station, OH (US); Trevor Jackson, Kirtland, OH (US); Carolyn McNeeley, Brunswick Hills, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 385 days.

(21) Appl. No.: 11/361,349

(22) Filed: Feb. 24, 2006

(65) Prior Publication Data

US 2006/0277774 A1 Dec. 14, 2006

Related U.S. Application Data

(60) Provisional application No. 60/687,596, filed on Jun. 3, 2005.

(51) Int. Cl.
*B43L 7/00* (2006.01)
*B26D 7/00* (2006.01)
*F21V 33/00* (2006.01)

(52) U.S. Cl. ............ 33/286; 33/484; 33/DIG. 21; 83/520; 83/614; 362/89

(58) Field of Classification Search .......... 33/286, 33/1 K, 32.1–32.3, 32.5, 41.1, 41.4, 41.6, 33/42, DIG. 21, 227, 228, 18.1, 18.2, 484–487, 33/491, 492, 274, 275 R, 20.1, 452, 456, 33/479, 465, 468, 472; 362/89, 98, 99, 119, 362/120; 83/520, 521, 607, 614

See application file for complete search history.

(56) References Cited

U.S. PATENT DOCUMENTS

| 426,138 | A | * | 4/1890 | Osborn | 33/485 |
| 1,572,304 | A | | 2/1926 | Morton | |
| 2,327,223 | A | | 4/1943 | Silver | |
| 2,378,249 | A | * | 6/1945 | Ruth | 83/520 |
| 2,753,938 | A | | 7/1956 | Theiss | |
| 3,142,217 | A | | 7/1964 | Busse | |
| 3,142,426 | A | | 7/1964 | Busse | |
| 3,370,497 | A | | 2/1968 | Busse | |
| 3,766,816 | A | | 10/1973 | Loveless | |
| 3,821,915 | A | | 7/1974 | Larrable | |
| 3,827,468 | A | * | 8/1974 | Markham | 144/136.1 |
| 3,868,878 | A | | 3/1975 | Peak | |
| 3,973,459 | A | | 8/1976 | Stowe | |
| 4,503,740 | A | * | 3/1985 | Brand et al. | 83/521 |
| 4,516,452 | A | | 5/1985 | Dahle | |
| 4,987,812 | A | * | 1/1991 | Benavidez | 83/455 |

(Continued)

*Primary Examiner*—G. Bradley Bennett
*Assistant Examiner*—Amy Cohen Johnson
(74) *Attorney, Agent, or Firm*—Calfee, Halter & Griswold LLP (57) ABSTRACT

The present invention is directed to a laser liner that may be utilized in the craft of scrapbooking. The laser liner of the present invention may comprise an elongated arm and at least one moveably mounted laser. The elongated arm may have a substantially straight longitudinal edge in which a user may line up a piece of media against it. The moveably mounted laser may be adapted to travel longitudinally along at least a portion of the elongated arm, and when powered, projects a beam upon the media in an orientation perpendicular to the longitudinal edge of the elongated arm.

12 Claims, 6 Drawing Sheets

U.S. PATENT DOCUMENTS

| | | | |
|---|---|---|---|
| 5,029,397 A * | 7/1991 | Palombi | 33/288 |
| 5,069,097 A | 12/1991 | Mori | |
| 5,322,001 A | 6/1994 | Boda | |
| 5,431,077 A | 7/1995 | Murakami | |
| 5,524,515 A | 6/1996 | Boda | |
| 5,671,647 A | 9/1997 | Mori | |
| 5,765,460 A | 6/1998 | Wathieu | |
| 5,802,942 A | 9/1998 | Cornell et al. | |
| 5,819,618 A | 10/1998 | Rodruguez | |
| 5,915,807 A | 6/1999 | Ilagan | |
| 5,996,459 A | 12/1999 | Cornell et al. | |
| 6,098,515 A | 8/2000 | Daley, Jr. | |
| 6,105,264 A * | 8/2000 | Phillips | 33/288 |
| 6,386,082 B2 | 5/2002 | Lee | |
| 6,644,156 B2 * | 11/2003 | Villacis | 83/425 |
| 6,976,764 B2 * | 12/2005 | Cheng et al. | 362/89 |
| 7,162,809 B2 * | 1/2007 | Haas et al. | 33/640 |
| 7,219,437 B2 * | 5/2007 | Dallman | 33/286 |
| 2002/0096031 A1 | 7/2002 | Yang | |
| 2003/0140761 A1 | 7/2003 | Schulz | |
| 2004/0221705 A1 | 11/2004 | Vossler et al. | |
| 2005/0039589 A1 | 2/2005 | Mori et al. | |
| 2005/0066787 A1 | 3/2005 | Mori et al. | |
| 2006/0037205 A1 * | 2/2006 | Sergyeyenko et al. | 33/426 |
| 2006/0168828 A1 * | 8/2006 | Dallman | 33/286 |
| 2007/0079516 A1 * | 4/2007 | Eckstein et al. | 33/286 |
| 2007/0144019 A1 * | 6/2007 | Delfini et al. | 33/286 |
| 2007/0271801 A1 * | 11/2007 | Campagna et al. | 33/286 |

* cited by examiner

LASER LINER

PRIORITY CLAIM

This application claims priority to U.S. Provisional Patent Application No. 60/687,596, entitled "Paper Cutter and Laser Liner," which was filed Jun. 3, 2005. Application Ser. No. 60/687,596 is incorporated herein by reference in its entirety.

BACKGROUND OF INVENTION

The present invention is directed to a laser liner. It is known that while scrapbooking, a person typically has trouble easily and accurately aligning photos or mementoes without first sketching in positioning lines. Reference lines are also typically employed when attempting to levelly scribe calligraphy into either a page of a photo album or scrapbook. Sketching in these positioning lines leads to an unattractive appearance of scrapbook pages, as many times the lines cannot be fully erased and remain visible. Further, sketching in reference lines using a ruler or straight edge with only a visual reference to the edge of scrapbook many times leads to skewed positioning lines, resulting in slanted pictures, keepsakes, and writing.

SUMMARY OF THE INVENTION

The laser liner of the present invention allows for easy and precise positioning of pictures, mementoes, and embellishments in a scrapbook, as well as level journaling and scribing. Thus, the present invention omits the need for written reference lines, which in turn leads to a more attractive scrapbook appearance.

Therefore, the present invention provides a laser liner comprising an elongated arm and at least one moveably mounted laser. In some embodiments, the elongated arm has a substantially straight longitudinal edge in which a user may line up a piece of media against it. The moveably mounted laser is adapted to travel longitudinally along at least a portion of the elongated arm, and when powered, projects a beam upon the media in an orientation perpendicular to the longitudinal edge of the elongated arm.

The present invention also provides a laser liner comprising two elongated arms and at least one moveably mounted laser attached to one of the elongated arms. In some embodiments, both elongated arms have substantially straight longitudinal edges. The moveably mounted laser is adapted to travel longitudinally along at least a portion of an elongated arm, and when powered, projects a beam upon the media in an orientation perpendicular to the longitudinal edge of the elongated arm to which it is attached.

Further, the present invention also provides a laser lining frame device comprising three or four elongated arms and at least one moveably mounted laser attached to one of the elongated arms. In certain embodiments, all of the elongated arms have substantially straight longitudinal edges. The moveably mounted laser is adapted to travel longitudinally along at least a portion of an elongated arm, and when powered, projects a beam upon the media in an orientation perpendicular to the longitudinal edge of the elongated arm to which it is attached.

DETAILED DESCRIPTION OF THE INVENTION

The present invention will now be described with occasional reference to specific embodiments of the invention. This invention may, however, be embodied in different forms and should not be construed as limited to the embodiments set forth herein. Rather, these embodiments are provided so that this disclosure will fully convey the scope of the invention to those skilled in the art.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities, properties, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values to the extent that such are set forth in the specific examples are reported as precisely as possible. Any numerical values, however, inherently contain certain errors necessarily resulting from error found in their respective measurements.

A complete understanding of the invention will be obtained from the following description when taken in connection with the accompanying drawing figures wherein like reference characters identify like parts throughout. For purposes of the description hereinafter, the terms "upper", "lower", "right", "left", "vertical", "horizontal", "top", "bottom", "front", "back" and derivatives thereof shall relate to the invention as it is oriented in the drawing figures. However, it is to be understood that the invention may assume various alternative variations, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a laser liner for general use in orienting or aligning items or text on media while scrapbooking. However, the present invention is not limited to scrapbooking uses, as the device may be employed in a wide assortment of crafts and activities wherein items are aligned before attachment. Non-limiting examples include orienting pictures on a page of a photo album, setting guide lines for writing in a level fashion, and setting reference lines in mechanical drawing. As used herein, the term "media" broadly refers to any substrate or surface on which positioning, alignment, or placement of items or text is desired. Specific examples of media provided herein are not intended to be limiting.

Figure 1:
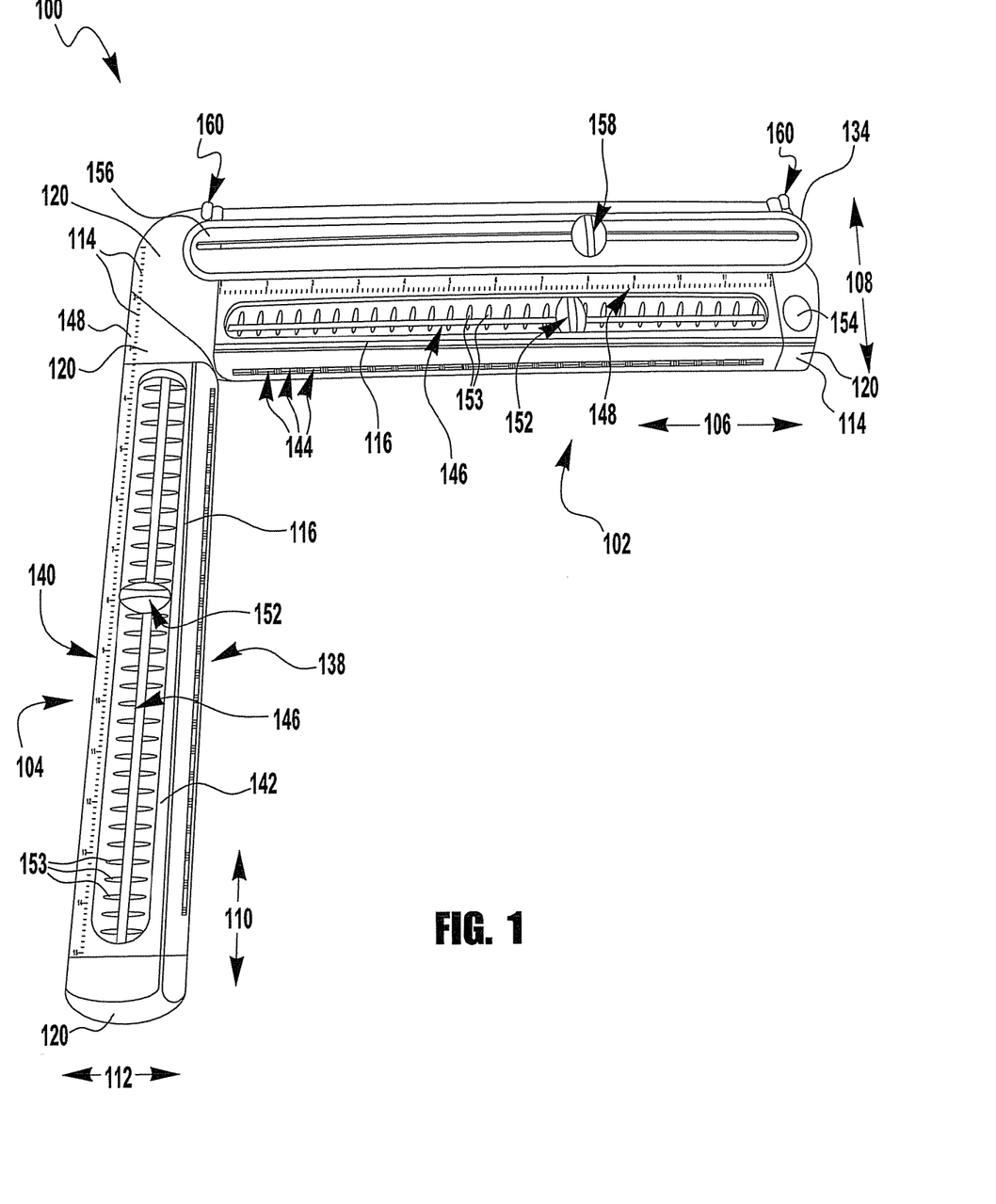
FIG. 1 is a perspective view of one embodiment of the laser liner of the present invention.

The laser liner of the present invention generally includes, among other things, at least one elongated arm and a moveably mounted laser. As representative of one embodiment, FIG. 1 illustrates a laser liner 100 in accordance with a first embodiment of the invention. As shown in FIG. 1, the laser liner of the illustrated embodiment comprises a major elongated arm 102 and a minor elongated arm 104, each elongated arm having a laser (not shown) moveably mounted within it. Both elongated arms 102,104 have generally elongated rectangular shapes, although one skilled in the art will recognize that other shapes could be used. While the depicted device has two elongated arms, alternate embodiments of the present invention may include only a single arm.

According to the depicted embodiment, the major elongated arm 102 has a longitudinal dimension 106 and a transverse dimension 108. In some embodiments, the major elongated arm 102 measures about fourteen inches in length along the longitudinal dimension 106, although other lengths may be utilized. The length of the major elongated arm 102 may be shorter or longer depending on the type and size of media that the laser liner 100 is adapted to employ. In some embodiments, the major elongated arm 102 measures about four inches in width along the transverse dimension 108, although other widths may be utilized.

According to the depicted embodiment, the minor elongated arm 104 also has a longitudinal dimension 110 and a transverse dimension 112. In some embodiments, the minor elongated arm 104 measures about fourteen inches in length along the longitudinal dimension 110, although other lengths may be utilized. Similar to the major elongated arm 102, the length of the minor elongated arm 104 may be shorter or longer depending on the type and size of media that the laser liner 100 is adapted to employ. In some embodiments, the minor elongated arm 104 measures about two inches in width along the transverse dimension 112, although other widths may be utilized.

As mentioned before, when not in use, the laser liner 100 can be folded into a compact structure for storage though use of a hinge 130 connecting the major and minor elongated arms 102,104. The use of the hinge 130 of the illustrated embodiments allows the longitudinal edges 124 of both the major elongated arm 102 and the minor elongated arm 104 to remain in contact with the substantially flat surface the laser liner 100 is resting on. However, the engagement of the major and minor elongated arms 102,104 may be any form of attachment now or hereafter known in the art which is suitable for the purposes of the invention. In another embodiment, the major elongated arm 102 may be snap fit onto the minor elongated arm 104, and the elongated arms 102,104 are capable of being detached from one another for storage and transportation. In yet another embodiment, the two arms may be connected by a pivot, and one of the elongated arms 102, 104 is capable of being swung under the other elongated arm 102,104 in a collapsible orientation.

According to some embodiments, both the major elongated arm 102 and the minor elongated arm 104 are comprised of a base 114 and a cover 116. The base 114 and the cover 116 can be formed from injection molded plastic. However, the materials used to construct the base 114 and the cover 116 of the major and minor elongated arms 102,104 may vary, and other suitable materials could also be used. Non-limiting examples include metal, wood, and various polymers. In addition, the preparation process used to form the base 114 and cover 116 may vary, and other suitable applications can be utilized. Non-limiting examples include blow molding, compression molding, and thermoforming. In some embodiments, an elongated arm may be formed of single piece.

According to some embodiments, the bases 114 of each of the elongated arms 102,104 are similar in shape and structure. A bases 114 may be comprised of a single piece of material, perhaps plastic, and include a floor 118, a back wall 140, and two side members 120 located at the distal ends of the base 114. The floor 118 of a base 114 is substantially flat as to maintain contact with a substantially planar surface such as a table.

In some embodiments, the floor 118 of a base 114 may include a multitude of feet 122 or other projections or extension such as ridges orientated in the longitudinal direction towards the back of an elongated arm 102,104. The feet 122 slightly heighten the back of an elongated arm 102,104 to encourage the longitudinal edge 124 of the arm to remain in contact with a planar surface on which the laser liner 100 rests. The illustrated embodiment shows three feet 122 located on the floor 118 of the base 114 of the major elongated arm 102. Of course, one of ordinary skill will recognize that the configuration, shape, size, spacing, quantity and location of feet 122 may vary.

According to the embodiment depicted in FIG. 1, the side members 120 of each base 114 serve as cap structures at both ends of the elongated arms 102,104. In certain embodiments, the side members 120 of the bases 114 are hollow enclosures, but the internal structure of the members may vary. In other embodiments of the invention, the side members 120 of the bases 114 may be solid.

Figure 4:
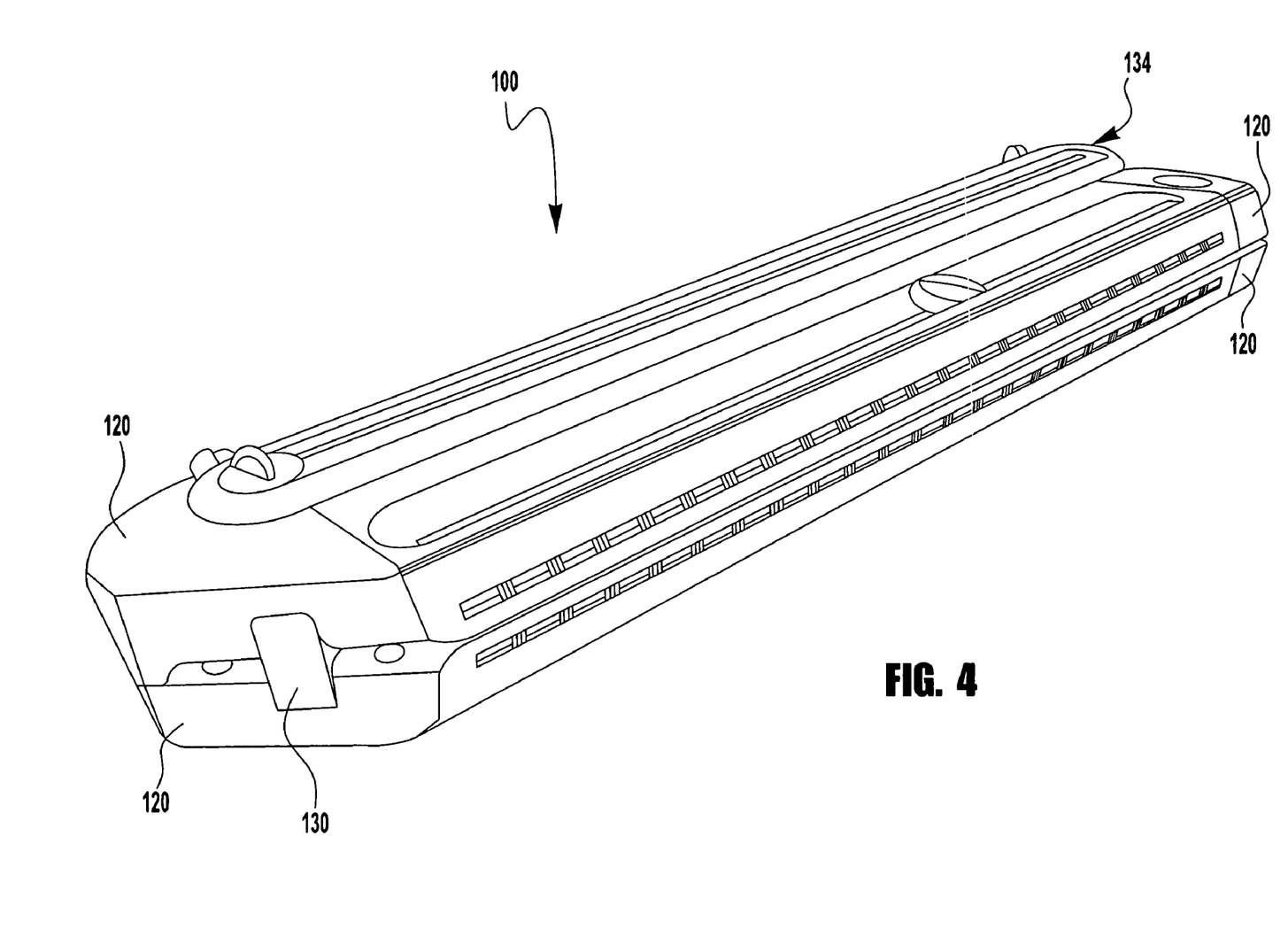
FIG. 4 is a perspective view of one embodiment of the laser liner of the present invention in a closed position.
Figure 5:
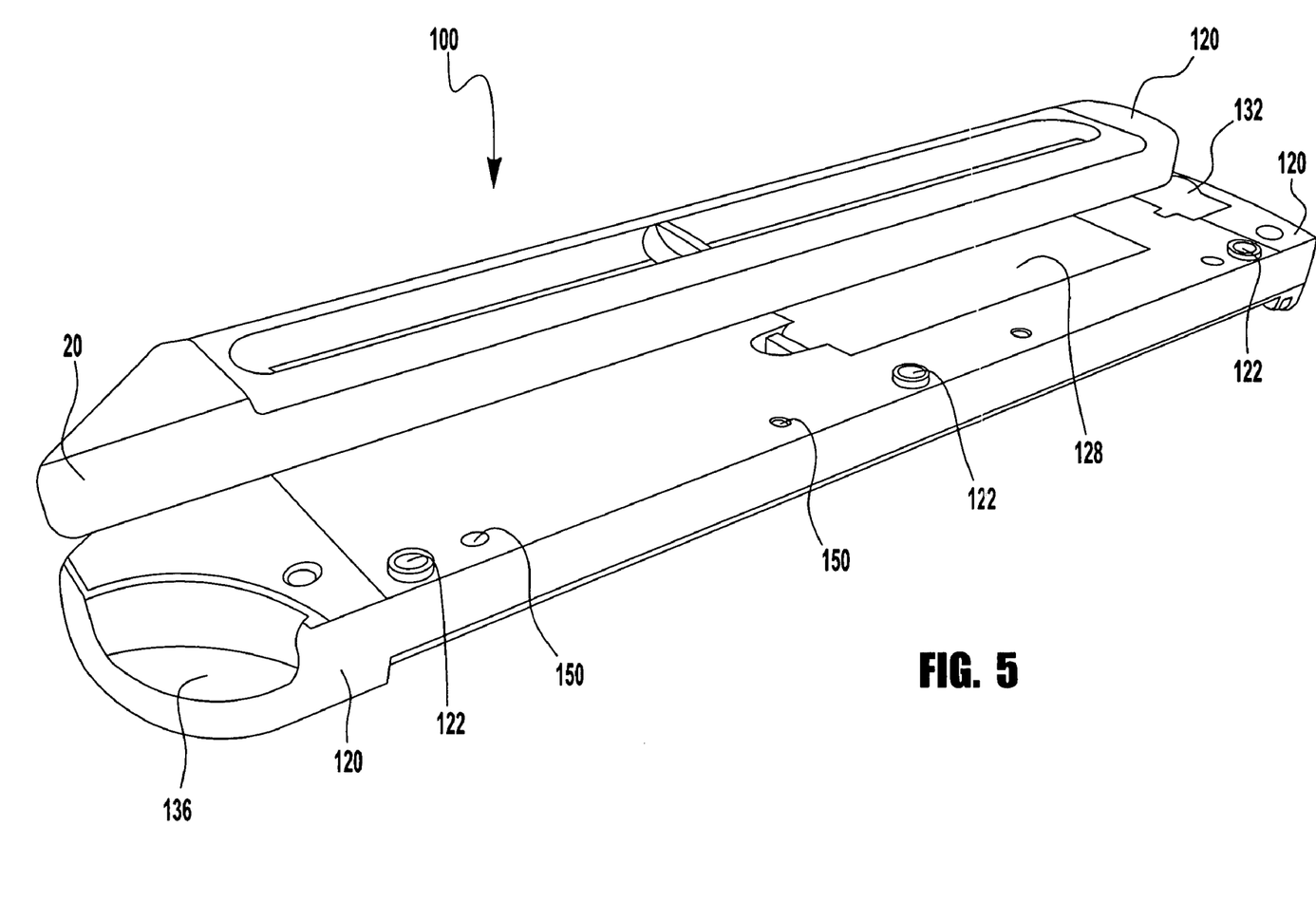
FIG. 5 is a perspective view of the underside of one embodiment of the laser liner of the present invention in a closed position.

As illustrated in FIG. 4, in an embodiment of the laser liner 100 of the present invention, one side member 120 of the base 114 of the major elongated arm 102 and one side member 120 of the base 114 of the minor elongated arm 104 are hingedly connected to each other. The hinged connection 130 allows for the user to fold the major elongated arm 102 and the minor elongated arm 104 together in a closed position so that the bottom of the base 114 of the major elongated arm 102 is in contact with the bottom of the base 114 of the minor elongated arm 104. This closed position for an embodiment of the laser liner of the present invention is shown in FIG. 4 and FIG. 5.

In some embodiments, the covers 116 of two or more elongated arms 102,104 may be similar in shape and structure. Generally a cover 116 may be comprised of a single piece of material, perhaps plastic, and include a front wall 138 and a roof 142. A cover 116 is shaped to fit over its corresponding base 114.

Figure 3:
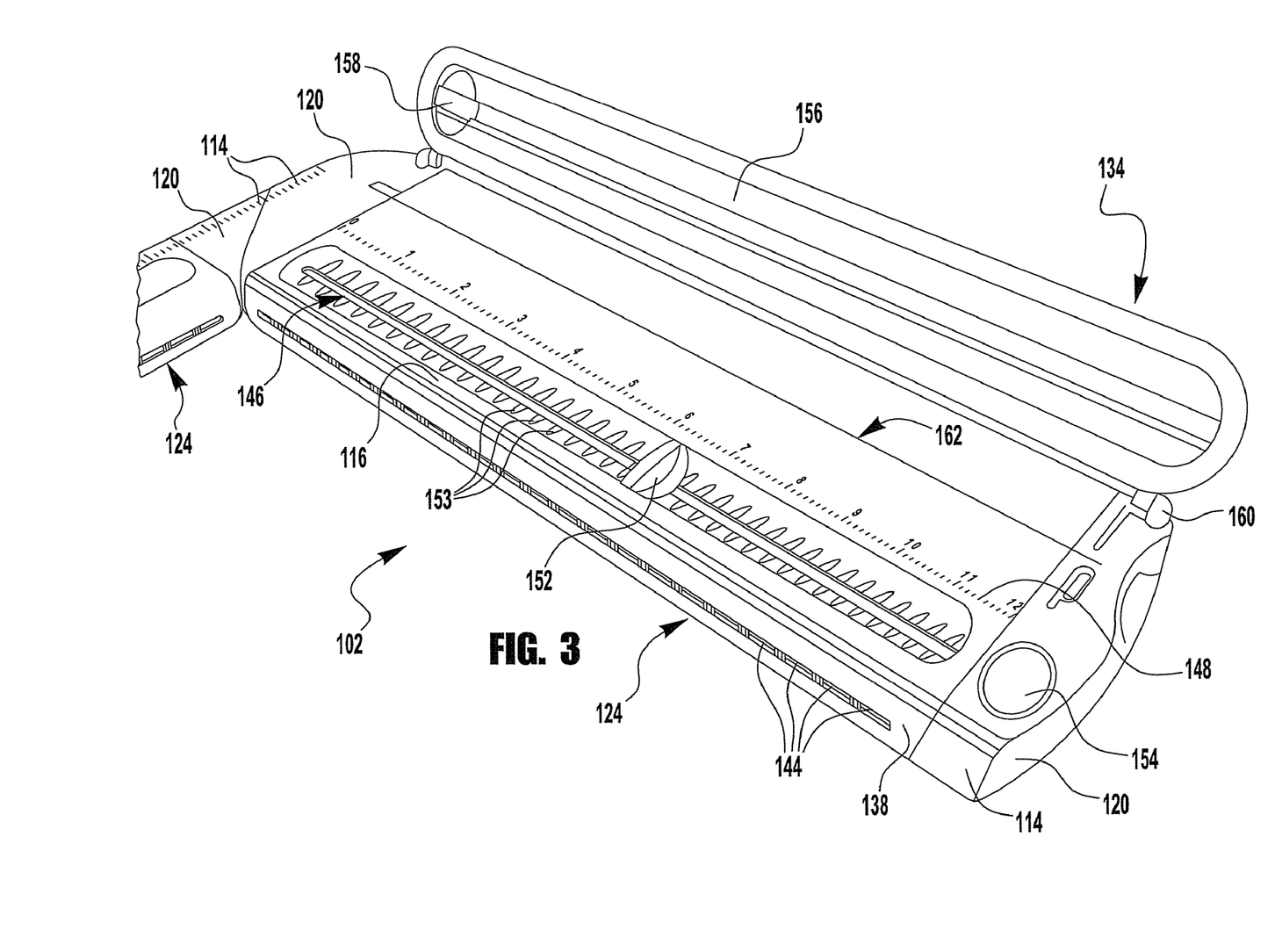
FIG. 3 is a perspective view of the major elongated arm of one embodiment of the laser liner of the present invention.

As shown in the embodiment depicted in FIG. 3, along the bottom of the front wall 138 of a cover 116, orientated in the longitudinal dimension of a elongated arm, is formed with a substantially straight longitudinal edge 124. When in use, the substantially straight longitudinal edge 124 of an elongated arm may juxtapose in a substantially parallel manner with substantially straight reference line on a piece of media. However, it should be apparent that when in use, a longitudinal edge 124 need not juxtapose in a substantially parallel manner with substantially straight reference line on a piece of media. Thus, the laser liner 100 of the present invention may be used to align items on various shapes and sizes of media. Moreover, in alternate embodiments, an elongated arm need not have a substantially straight longitudinal edge. Non-limiting examples of possible shapes of media that may used with devices of the present invention include circles, half-circles, triangles, squares, pentagons, and octagons and any combination of these, or any other regular or irregular shape.

According to some embodiments, an elongated arm may have above its longitudinal edge 124 a series of apertures 144 formed along the front wall 138 of the cover 116 running in the longitudinal direction of the elongated arm. These apertures 144 allow laser light to shine from a laser source (not shown) positioned inside the elongated arm 102,104, through the cover 116, and onto the media surface. The apertures 144 may be positioned in a manner that the laser source, in any position, is not enabled to be shielded by front wall 138 of the cover 116.

As seen in the illustrated embodiments of FIG. 1 and FIG. 3, elongated openings 146 may be formed in the roof 142 of the covers 116, defined along the longitudinal dimension of the elongated arms 102,104. These elongated openings 146 allow laser housings 152 to be moveably mounted in a slideable manner within the elongated arms 102,104. It would be appreciated by those skilled in the art that various other methods for moveably mounting laser housings 152 within or mounted on top of the elongated arm 102,104 may be employed.

According to embodiments of the laser liner 100 of the present invention as depicted in FIGS. 1 and 3 in which the laser housing 152 slides along the elongated opening 146 defined within the roof 142 of the cover 116 of the elongated arm 102,104, the top of the base 114 may include a series of raised notches 153 to help guide and control laser positioning. The incrementally spaced raised notches 153 within the elongated arm on the base 114 allow the laser to rest at periodic intervals along the elongated opening 146. These notches 153 may provide the user reference points along the slit 146 to allow for uniform positioning of items on separate pieces of media.

Figure 2:
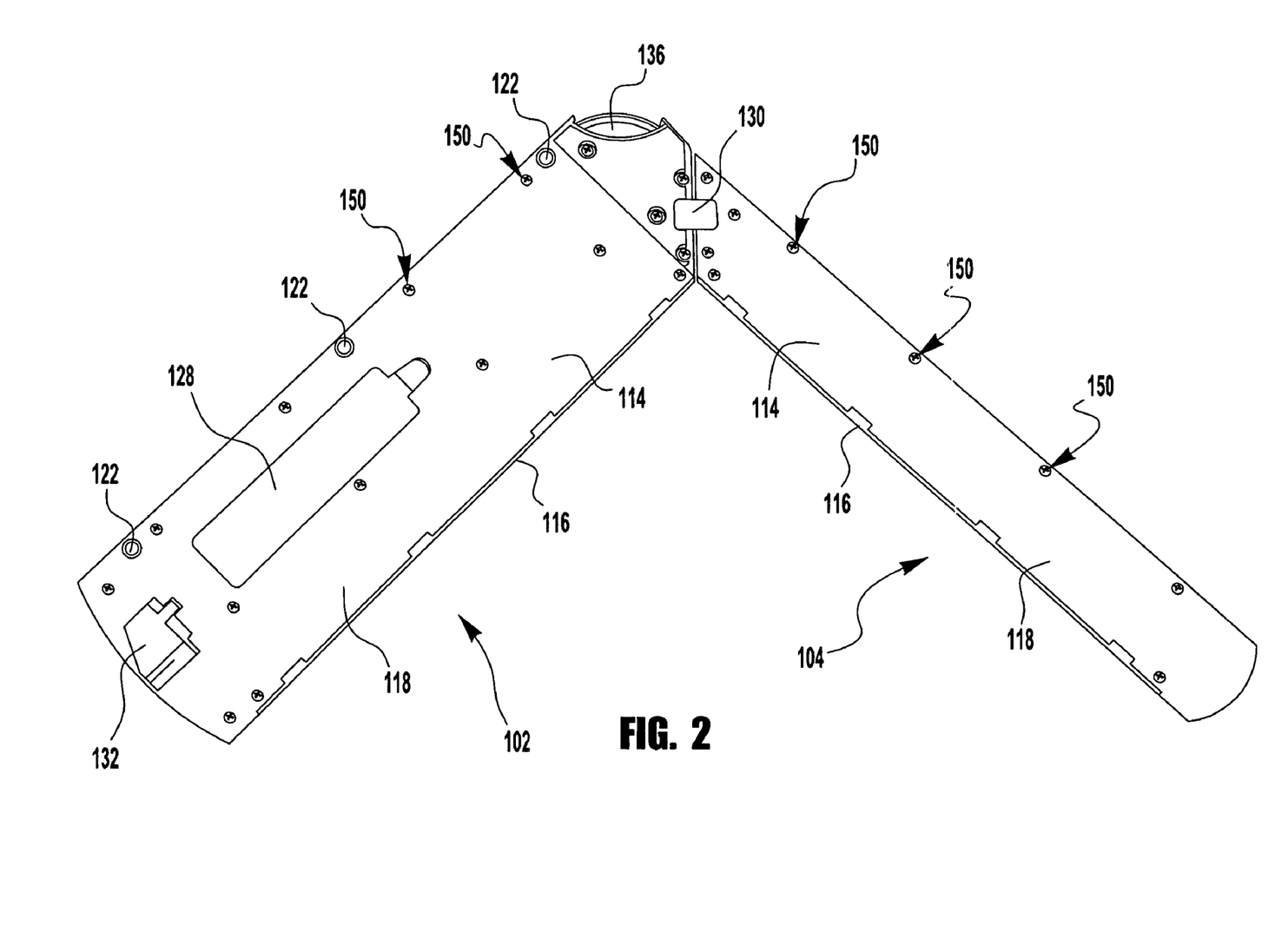
FIG. 2 is a perspective view of the underside of one embodiment of the laser liner of the present invention.

The base 114 may be connected to the cover 116 through any method of attachment now or hereafter known. As seen in FIG. 2, the illustrated embodiment shows attachment of the base 114 and the cover 116 through a plurality of screws 150. However, the method of attachment may vary, and other methods of attachment may be utilized, such as plastic welds, glue, or snap fitting the pieces together through tabs and apertures.

The laser liner 100 also includes at least one laser (not shown), contained inside a laser housing 152, moveably mounted on an elongated arm 102,104. The embodiment illustrated in FIG. 1 shows two moveably mounted lasers, one mounted within the major elongated arm 102 and one mounted within the minor elongated arm 104. However, embodiments of the elongated arm(s) of the present invention may contain multiple moveably mounted lasers on or within one or both elongated arms.

According to the depicted embodiment, the laser housing 152 is moveably mounted within the elongated arm such that when powered, a laser light beam shines through an aperture 144 in the front wall 138 of the cover 116 and over a surface of the media. Before the laser light leaves an aperture 144 in the front wall 138 of the cover 116, the laser light may pass through a diffuser (not shown) in the laser housing 152. The diffuser may point the laser light down towards the media. In certain embodiments, the laser is configured to shine a laser light beam brightly for a distance of twelve inches outside of an aperture 144 in the front wall 138 of the cover 116, and then quickly diffuse past that distance. However, the laser may be configured to shine a laser light beam brightly for varying distances depending on the application of the laser liner 100.

In addition, in alternate embodiments, the laser housing 152 may also be removable from the elongated arm, as to provide for switching out and replacement of the laser. In yet other embodiments, the laser housing 152 may not be mounted within the elongated arm. For instance, in other embodiments, the laser housing (not shown) may be mounted on the front or top of the elongated arm, 102,104 and may be permanent or removeably attached to the elongated arm 102,104. According to some embodiments of the device, other surface mounted notches, or other implements may be used to guide and control the laser positioning.

The source of the laser light beam is any laser (not shown) known in the art which is suitable for the purposes of the invention. According to some embodiments, the laser liner 100 utilizes a class III laser, having an input voltage of about 3 volts, and power of about 2.5 to 3.0 miliwatts. However, any laser now or hereafter known, or other high intensity light source capable of projecting a light beam for an extended length, may be employed. One skilled in the art will therefore appreciate that other laser sources of varying class, voltage, and power may be employed in the present invention.

In one embodiment of the laser liner of the present invention, as shown in FIG. 3, one side member 120 of one of an elongated arm 102,104 may have an activator switch opening defined within it. In that illustrated embodiment, the activator switch opening is located on the major elongated arm 102. More specifically, the activator switch opening is located the top of the side member 120 of the base 114 that is not hingedly connected, but other locations may be used. Non-limiting examples of location possibilities include any location on any of the other three side members 120. In addition, it should be apparent that the activation switch opening is optional and need not be included with all embodiments of the laser liner 100.

The laser liner 100 may include an activation switch 154 (connected to the laser housing by wires not shown). As illustrated in FIG. 3, embodiments of the present invention may include the activation switch 154 mounted on the major elongated arm 102. More specifically, the activation switch 154 may be mounted on the top of the side member 120 of the base 114 that is not hingedly connected, but other various locations may be used. Non-limiting examples of location possibilities include any location on any of the other three side members 120, on the cover 116, or directly on the laser housing 150. In addition, it should be apparent that the activation switch 154 is optional and need not be included with all embodiments of the laser liner 100.

In some embodiments of the laser device, there may be a battery opening defined within at least one of the elongated arms 102,104 for access to a battery compartment (not shown) formed within the elongated arm. In the illustrated embodiment, the battery opening is within the floor 118 of the base 114 of the major elongated arm 102. However, the battery opening, and thus the battery compartment, may be located elsewhere on the laser liner 100 and there may more than one such compartment located on one or more of the elongated arms. In addition to containing the batteries to power the laser, the battery compartment may also hold replacement blades for a possible media trimmer. In certain embodiments, a snap fit cover 128 encloses the battery compartment, although other means of covering the battery compartment may also be used. In addition, it should be apparent that the battery opening, battery compartment, and snap fit cover 128 are optional and need not be included with all embodiments of the laser liner 100.

The power to operate the laser of the present invention may come from any power source now or hereafter known that would provide enough power to operate the laser or lasers of the invention. Embodiments of the laser liner 100 may include two 1.5 volt AA alkaline batteries that are supported and enclosed within the battery compartment of the elongated arm. The batteries may be electronically connected with the activation switch 154 of the laser by wires, powering the laser of the present invention. Different types and numbers of batteries could be effectively used. It should be apparent to those skilled in the art that the present invention could also be powered by power sources other than batteries. Non-limiting examples include standard household electrical current or a direct current power sources, such as a vehicle's cigarette lighter.

As illustrated in FIG. 2, the laser liner 100 can include a locking mechanism 132 to hold the device in a closed position. The locking mechanism 132 may be located on the bottom of the side member 120 of the base 114 that is not hingedly connected on either arm. The illustrated embodiment shows the locking mechanism 132 located on the major elongated arm 102. More specifically, the locking mechanism 132 is on the bottom of the side member 120 of the base 114 that in not hingedly connected to the minor elongated arm 104. In other embodiments, the locking mechanism 132 may be located in alternate locations, as the location of the locking mechanism 132 may vary. When the major and minor elongated arms 102,104 are folded together for transportation or storage, the locking mechanism 132 may be employed to hold the elongated arms 102,104 together to decrease the possibility of damage. The locking mechanism 132 can also further serve to lock the media trimmer 134 into a position for transportation for safety purposes.

As illustrated in FIG. 5, in one embodiment of the laser liner of the present invention the side member 120 of the base 114 of one of the elongated arms 102,104 may also include a handle portion 136 for the user to grasp and hold the laser liner 100 when in transport. The illustrated embodiment shows the handle portion 136 located on the major elongated arm 102. More specifically, the handle portion 136 is located on the side member 120 of the base 114 that is hingedly connected to the minor elongated arm 104. In other embodiments, the handle may be located in alternate locations, as the location of the handle may vary in alternate embodiments.

The cover 116 may also include measuring indicia 148 oriented along the longitudinal dimension of either or both of the elongated arms 102,104. The illustrated embodiment shows the measuring indicia 148 molded into the plastic along both the elongated arms 102,104. The method of including measuring indicia 148 on the cover 116 of the laser liner 100 may vary. Other methods of including measuring indicia 148 may alternatively be employed, such as raised detail on the cover, screen-printing, or labeling. The illustrated embodiment shows measuring indicia 148 in the increments of inches. The increments of the indicia 148 may vary, and other standards may be employed such as the metric standard utilizing centimeters. Further, equally spaced indicia that follow no standard measurement may be utilized. Measuring indicia 148 may also be used that show a combination of measurement standards, such as inches and centimeters shown together in combination along the longitudinal dimension of the cover 116.

As shown in FIG. 1, FIG. 3, and FIG. 4, embodiments of the laser liner 100 of the present invention may also include an attached media trimmer 134. The media trimmer 134 may consist of any trimming assembly now or hereafter known in the art which is suitable for the purposes of the invention. In the illustrated embodiment of FIG. 3, the media trimmer 134 comprises an elongated plate 156 having a central elongated slit and a blade housing 158 that supports a cutting blade (not shown). The blade housing 158 is inserted in the elongated slit of the elongated plate 156 and slides along the length of the longitudinal dimension of the elongated plate 156. The blade housing 158 of the illustrated media trimmer 134 may also be removable to allow for replacement of the cutting blade. According to some embodiments, the blade housing 158 is inserted into, or removed from, the elongated slit of the media trimmer 134 by deformation along the elongated slit of the elongated plate 156. Once the media is received in the media trimmer 134, the movement of the blade housing 158 causes the blade to engage and cut the media. A user therefore easily trims a photo or picture into a proper size with the same device that they use to accurately position the photo or picture into an album or scrapbook. One skilled in the art will recognize that a variety of media trimmers 134 could be employed by the present invention, and the present invention is not limited to a media trimmer 134 as shown in the illustrated embodiments.

The media trimmer 134 may be engaged with one of the elongated arms 102,104 of the laser liner 100 in a variety of methods. The attachment of the media trimmer 134 to the elongated arm 102,104 may be any form of attachment now or hereafter known in the art which is suitable for the purposes of the invention. The form of attachment may either be permanent attachment or removable attachment. Non-limiting examples of means of attachment include hinges, screws, welds, snap fitting through tabs and apertures, or resting on location points.

In the embodiments illustrated in FIG. 1 and FIG. 3, the media trimmer 134 is hingedly attached on both ends of the elongated plate 156 of the media trimmer 134 to the top of the side members 120 of the base 114 of the elongated arm 102,104. This form of attachment allows the media trimmer 134 to lay flat on the elongated arm 102,104, or rotate back on its hinges 160 to be removed from the laser liner 100. In the illustrated embodiments, the media trimmer 134 may be made of pliable plastic, and may be removed by deforming the elongated plate 156 enough to release one of the hinges 160. When one of the hinges 160 is released, the other hinge 160 is permitted to easily slip out, enabling removal of the media trimmer 134.

In a different embodiment not shown, the media trimmer 134 may be removeably attached to the elongated arm upon a single pivot on one of the ends of the elongated plate 156 of the media trimmer 134. The elongated arm may include a single protruding nipple that is shaped to correspond with a cavity formed in the elongated plate 156 of the media trimmer 134. For attachment, the cavity of the elongated plate 156 of the media trimmer 134 is positioned over the nipple of the elongated arm, where the longitudinal dimension of the elongated arm is parallel with the longitudinal dimension of the elongated plate 156 of the media trimmer 134. The nipple and cavity are coupled such that the nipple fits inside the cavity as to temporarily affix the media trimmer 134 to the elongated arm. When not in use, the media trimmer 134 may either pivot back out of the way utilizing the one pivot point provided by the nipple and cavity, or the media trimmer 134 of this embodiment may also be removed from the elongated arm by lifting the media trimmer 134 off of the nipple of the elongated arm.

In another embodiment not shown, the media trimmer 134 may engage with the elongated arm by resting onto location points. The elongated arm includes two raised ridges that correspond to the shape of the ends of the elongated plate 156 of the media trimmer 134. In this embodiment, the media trimmer 134 is not attached to the elongated arm, but is resting in between the two raised ridges on the elongated arm. When not in use, the media trimmer 134 may be removed by simply lifting the media trimmer 134 off of the elongated arm of the laser liner.

According to some embodiments, that include a media trimmer, the laser liner 100 may further include an elongated groove 162 defined in the top of the elongated arm 102, 104 for receiving the blade of a media trimmer 134. As shown in the illustrated embodiment, this groove 162 corresponds to the placement of the media trimmer 134, and allows for tracking of the blade of the blade housing 158 of the media trimmer 134 to ensure cleaner, straighter trimming of media. It should be apparent that the elongated groove 162 is optional and need not be included with all embodiments of the laser liner 100.

When in use, the major elongated arm 102 may be engaged with the minor elongated arm 104 in a substantially perpendicular orientation, i.e. the positioning of the elongated arms 102, 104 may form a substantially right angle. However, in alternate embodiments of the present invention, when in use, the major elongated arm 102 and the minor elongated arm 104 may not be in a substantially perpendicular orientation. In these embodiments, the positioning of the elongated arms 102, 104 may form various acute and obtuse angles to accommodate varying shapes and sizes of media. Moreover, in some embodiments the arms are not connected or are capable of being disconnected such that they may be used in angular or parallel orientations, or may be used separately.

In accordance with a second embodiment of the present invention, the laser liner 100 comprises a single elongated arm and a moveably mounted laser. The laser liner 100 of this embodiment may include some or all of the features of the alternate embodiments mentioned above. This embodiment of the present invention may further include the non-limiting features of a media trimmer, measuring indicia along the longitudinal direction of the elongated arm, multiple moveably mounted lasers, and/or various sources of power.

Figure 6:
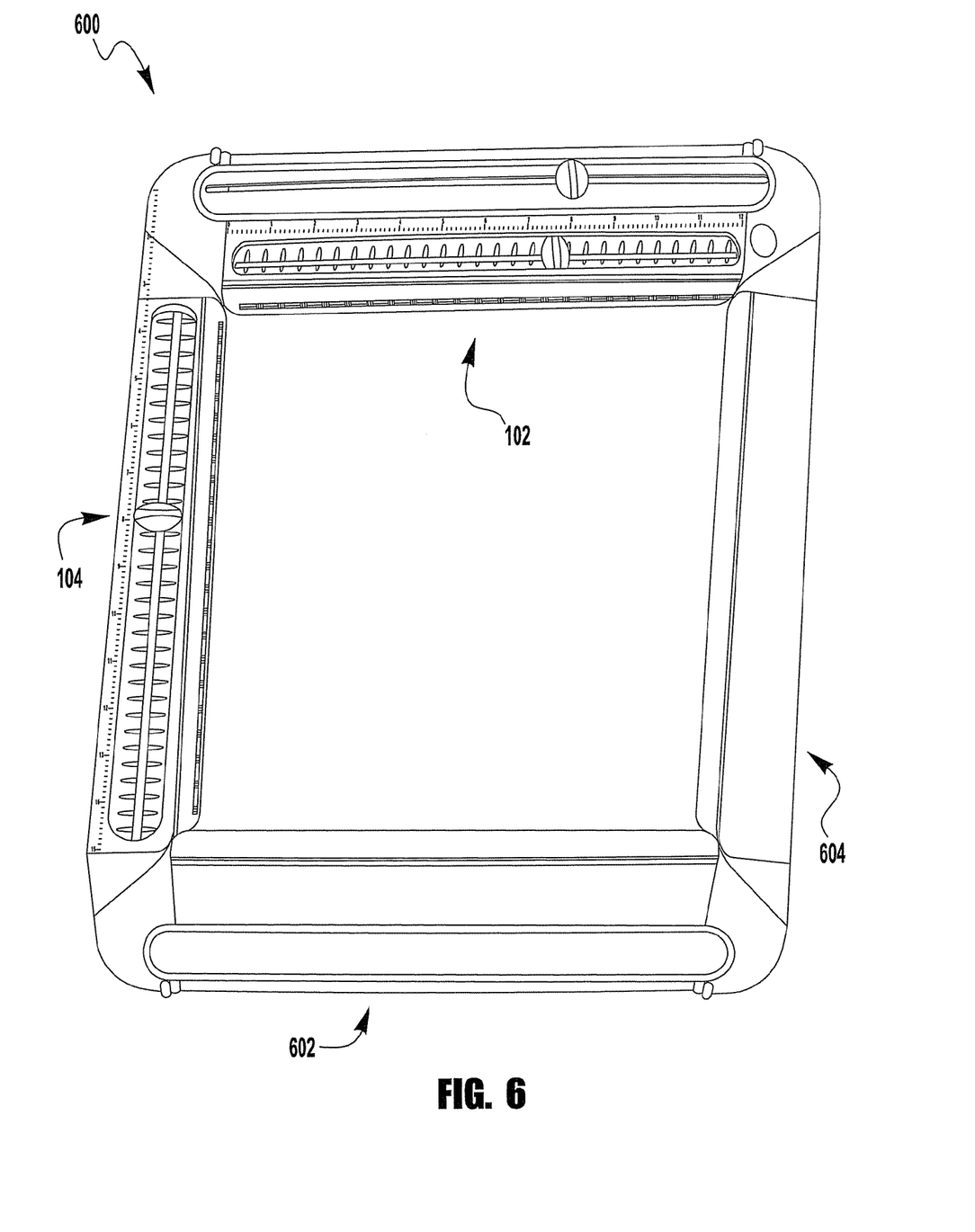
FIG. 6 is a perspective view of an additional embodiment of the laser liner of the present invention.

In accordance with additional embodiment of the present invention, the laser liner may comprise three or four elongated arms connected together to form a frame, and at least one moveably mounted laser. Referring to FIG. 6, an embodiment of the laser liner 600 comprising a first arms 102, second arm 104, third arm 602 and fourth arm 604 is shown. In certain embodiments, the three or four elongated arms may be permanently locked together with to each other, or other embodiments, may be hingedly attached to one another in a manner that when one of the hinged connections is unattached, the device can be folded together for travel. In yet other embodiments, the arms may be separate from another. The laser liner frame of this embodiment may include some or all the features of the alternate embodiments mentioned above. This embodiment of the present invention may further include the non-limiting features of one or more media trimmers, measuring indicia along the longitudinal direction of one or more of the elongated arms, multiple moveably mounted lasers, and/or various sources of power.

It will be understood by those skilled in the art that while the foregoing description sets forth in detail preferred embodiments of the present invention, modifications, additions, and changes might be made thereto without departing from the spirit and scope of the invention.

The invention claimed is:

1. A laser lining device, comprising:
   an elongated arm having a longitudinal dimension and a transverse dimension, wherein the elongated arm has a longitudinal edge;
   at least one laser moveably mounted on the elongated arm and adapted to travel along at least a portion of the longitudinal dimension, whereby, when the laser is powered, it projects a beam along a path that is parallel to an axis through the transverse dimension of the elongated arm and perpendicular to an axis through the longitudinal dimension of the elongated arm; and
   a plurality of raised feet along the bottom of the elongated arm that allow the longitudinal edge to lay flat on a surface.

2. The device of claim 1, wherein the longitudinal edge is substantially straight such that when the device is in use the longitudinal edge is positioned in parallel juxtaposition with a substantially straight reference line on a piece of media.

3. The device of claim 2, wherein the elongated arm contains spaced notches that allow the laser to rest at pre-determined intervals along the longitudinal dimension of the elongated arm.

4. The device of claim 1, further comprising a media trimmer attached to and oriented along the longitudinal dimension of the elongated arm.

5. The device of claim 4, wherein the elongated arm of the laser liner further comprises a groove orientated in the longitudinal dimension of the elongated arm that corresponds to an elongated slit of the media trimmer for receiving the blade of the media trimmer.

6. A laser lining device, comprising:
   a first elongated arm having a longitudinal dimension and a transverse dimension, and having a substantially straight longitudinal edge;
   at least one laser moveably mounted on the first elongated arm and adapted to travel along at least a portion of the longitudinal dimension, whereby, when the laser is powered, it projects a beam along a path that is parallel to an axis through the transverse dimension and perpendicular to an axis through the longitudinal dimension of the first elongated arm; and
   a second elongated arm having a longitudinal dimension and a transverse dimension, and having a substantially straight longitudinal edge, wherein the first elongated arm and the second elongated arm are hingedly attached to one another at a terminus along their longitudinal dimensions.

7. The device of claim 6, wherein the first elongated arm contains spaced notches that allow the laser to rest at pre-determined intervals along the longitudinal dimension of the first elongated arm.

8. The device of claim 6, further comprising a plurality of raised feet along the bottom of at least one of the elongated arms.

9. The device of claim 6, further comprising a media trimmer attached to and oriented along the longitudinal dimension of either the first elongated arm or the second elongated arm.

10. A laser lining frame device, comprising:
    a first elongated arm having a longitudinal dimension and a transverse dimension, and having a substantially straight longitudinal edge;
    at least one laser moveably mounted on the first elongated arm and adapted to travel along at least a portion of the longitudinal dimension, whereby, when the laser is powered, it projects a beam along a path that is parallel to an axis through the transverse dimension and perpendicular to an axis through the longitudinal dimension of the first elongated arm, wherein the first elongated arm contains spaced notches that allow the laser to rest at pre-determined intervals along the longitudinal dimension of the first elongated arm;

a second elongated arm having a longitudinal dimension and a transverse dimension, and having a substantially straight longitudinal edge; and a third elongated arm having a longitudinal dimension and a transverse dimension, and having a substantially straight longitudinal edge;

a fourth elongated arm having a longitudinal dimension and a transverse dimension, and having a substantially straight longitudinal edge, wherein all four elongated arms are attachable to one another at each terminus along their longitudinal dimensions; and a media trimmer attached to and oriented along the longitudinal dimension of one of the elongated arms.

11. The device of claim 10, further comprising at least one additional laser moveably mounted to at least one of the second, third, or fourth elongated arms and adapted to travel along at least a portion of the longitudinal dimension of the arm to which the laser is moveably mounted, whereby, when the laser is powered, it projects a beam along a path that is parallel to an axis through the transverse dimension and perpendicular to an axis through the longitudinal dimension of the elongated arm to which the laser is moveably mounted.

12. A laser lining and media trimming device, comprising:

first and second elongated arms, each having a longitudinal dimension and a transverse dimension, a substantially straight longitudinal edge, and each having measuring indicia oriented along the longitudinal dimension, wherein the first and second elongated arms are connected to each other;

at least one laser moveably mounted on the first elongated arm and at least one laser moveably mounted on the second elongated arm, each laser adapted to travel along at least a portion of the longitudinal dimension, whereby, when the laser is powered, it projects a beam along a path that is parallel to an axis through the transverse dimension and perpendicular to an axis through the longitudinal dimension of the elongated arm to which it is moveably mounted;

a media trimmer detachably attached to and oriented along the longitudinal dimension of one of the elongated arms, and including an elongated plate having a central elongated slit and a blade housing supporting a blade, the blade housing inserted in the elongated slit of the elongated plate and engaging therewith in a slideable fashion along at least a portion of the length of the elongated plate and parallel to the longitudinal dimension of the elongated arm to which the media trimmer is detachably attached; and a power supply for the lasers selected from at least one battery, an AC power source, and a DC power source.

* * * * *